United States Patent [19]
Andersson

[11] 3,854,546
[45] Dec. 17, 1974

[54] PROPULSION DEVICE

[75] Inventor: Kjell Arne Andersson, Huskvarna, Sweden

[73] Assignee: Husqvarna Vapenfabriks Aktiebolag, Huskvarna, Sweden

[22] Filed: Nov. 13, 1972

[21] Appl. No.: 306,334

[30] Foreign Application Priority Data
Nov. 12, 1971 Sweden................................. 14499

[52] U.S. Cl............................................... 180/70 R
[51] Int. Cl............................................ B60k 17/04
[58] Field of Search ........ 180/19 R, 19 S, 19 H, 74, 180/10

[56] References Cited
UNITED STATES PATENTS
2,055,724  9/1936  Irgens................................ 180/19 R
2,941,610  6/1960  Clemson ........................... 180/19 R Primary Examiner—Richard A. Schacher
Attorney, Agent, or Firm—Holman & Stern

[57] ABSTRACT

A transmission assembly for driving a pair of wheels mounted on a chassis in diagonally offset positions in which a gearing arrangement at each wheel includes a pinion gear on the end of a driving shaft and a gear secured to the wheel, with both gears in mesh with one another, at one wheel in front of the wheel axle and at the other wheel behind the wheel axle.

5 Claims, 1 Drawing Figure

PATENTED DEC 17 1974
3,854,546
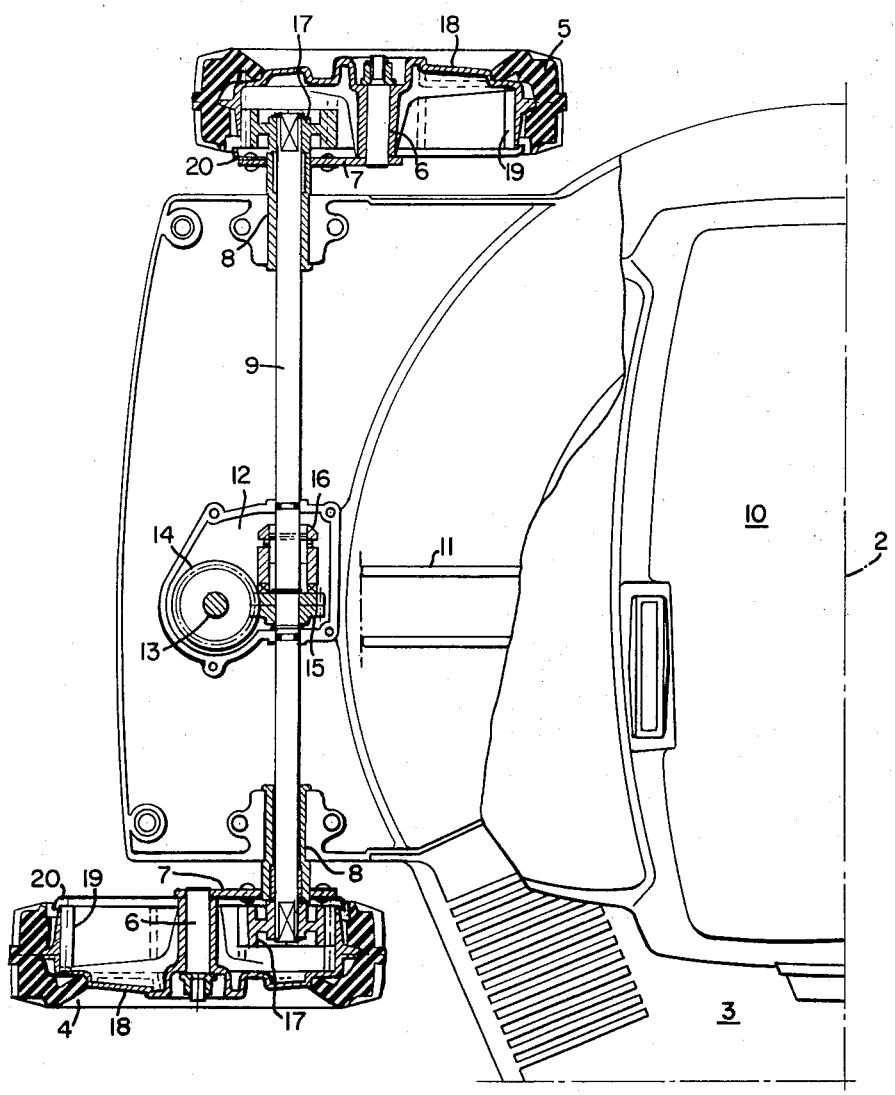

ABSTRACT

PROPULSION DEVICE

The present invention relates to a transmission assembly for driving at least a pair of wheels of a vehicle and more especially to drive a pair of wheels of small gardening implements such as lawn mowers.

BACKGROUND OF THE INVENTION

In machines provided with a driven tool e.g. a rotor, the arrangement of two driving wheels on a common axle may be disadvantageous in regard of compactness and especially when it is wanted to have the rotor unsymmetrically mounted in the machine. This problem can be solved by mounting the wheels unsymmetrically to the chassis, so that with a four wheeled machine two wheels on one side of the machine will be differently spaced to the two wheels on the other side of the machine. Such an arrangement of the wheels will, however, complicate the transmission of the drive to the wheels.

PRIOR TECHNIQUE

Transmission assemblies including a coupling and a worm gear having a driving shaft constituting a wheel axle on which the driving wheels of the implement are mounted are generally known. Also, with small machines having their driving wheels mounted on shafts secured to a chassis, it is also frequent to provide gears at each one of the wheels in order to transfer and gear down the driving motion of a driving shaft to each one of the gears. Such propulsion devices are generally known and need here no specified description.

OBJECTS AND SUMMARY OF THE INVENTION

An object of the present invention is to provide a transmission unit for driving a pair of wheels, the axles of rotation of each wheel being parallel and spaced apart from one another.

Thus, according to the present invention, there is provided a transmission assembly for driving at least a pair of wheels of a vehicle comprising a driven shaft, the axles of rotation of said wheels being parallel and spaced from one another, said shaft being in driving connection with each of said wheels through a gearing arrangement housed within each wheel so that each wheel rotates in the same direction as said shaft.

Conveniently, the gearing arrangement comprises a ring gear mounted in said wheels to be rotatable therewith and a pinion gear housed in said wheel, and mounted on an end of said shaft to be rotatable therewith, with said ring gear and pinion gear being engaged so that rotation of said shaft causes rotation of said wheel.

Advantageously, the driven shaft is journalled at each end in a bush which is pivotally connected to a chassis of the vehicle, each bush being provided with an arm which carries a shaft for mounting a respective one of said wheels.

BRIEF DESCRIPTION OF THE DRAWING

An embodiment of the propulsion device according to the invention will be hereinafter particularly described, by way of example only, with reference to the accompanying drawing which partly shows in a section a pair of driven wheels of a machine.

DETAILED DESCRIPTION OF THE INVENTION

The machine is provided with a chassis 1 carrying an engine (not shown) and a rotor (not shown) secured to a vertical shaft (not shown) erected through a point 2. The shaft is laterally offset in relation to a center line (not shown) along the chassis, so that the rotor, which is situated below a shield 3, has a working area which is extended towards one side of the machine. A pair of wheels 4, 5 are mounted unsymmetrically on the chassis so as to permit such a lateral displacement of the rotor without the necessity of elongating the chassis. Each of the wheels 4, 5 is mounted on a respective wheel shaft 6. Each wheel shaft is carried by a pair of arms 7 which are pivotally connected to the chassis by means of a hub 8 in the chassis, so that the height of the chassis above the ground can be adjusted by turning the arms by means of a lever and a lever system (not shown). This arrangement for height adjustment is generally known from lawn mowers and need no specified description. It is also frequent in such arrangements to find that the hub is penetrated by a driving shaft 9 constituting a fulcrum to the arm 7. The respective arms 7 associated with wheels 4, 5 are shown extending in opposite directions which has the effect that the wheel 4 is positioned forward of the other, 5. The angle subtended between the arms is at all heights always obtuse as the turning of each arm from the lowest position to the highest does not exceed an angle of 90°. In the embodiment shown, the shaft 9 is driven by an engine (not shown) located below a machine hood 10. The drive from the engine to the shaft 9 is transmitted by a V-belt 11 which extends into a gear case 12, in which a vertical shaft 13, a pulley and a worm gear 14 transfer the driving motion from the belt to a gearwheel 15 journalled on the driving shaft 9. The gear wheel 15 is connectable with the driving shaft and disconnectable therefrom by means of a hand-operated catch, which guides a driver 16 to and from the worm wheel. A gear 17 is located at each end of the driving shaft 9, with each gear 17 being mounted on the shaft 9 so as to be rotatable therewith. The interior of drums 18 associated with each wheel 4, 5 are each provided with a ring gear 19 which is engaged with a respective gear 17. The gears in the wheel 4, 5 are each protected by a shield 20. Even though, the as shown in the drawing, gear 17 associated with wheel 5 is located to the left of its wheel pivot 6 and gear 17 associated with wheel 4 is located to the right of its wheel pivot 6, wheels 4, 5 is undirected, i.e., the shaft and each wheel always rotate in the same direction.

The embodiment shown of the propulsion device has many advantages. First to be mentioned is the fact that the position of one wheel is offset in the driving direction of the machine in relation to the position of the other; moreover, a wanted gearing down of the rotation speed of the driving shaft by means of the gears is obtained and the gears are housed in the wheel rim behind a shield.

The drawing shows a preferred embodiment of a device according to the invention and is to be considered a means for the comprehension of the invention. In this way, diagonally positioned wheels can, of course, be driven by other driving means than the ones here shown, e.g. ordinary gears on the wheel axles could be substituted for the internal gears 19 as shown by dotted lines on the drawing, but there will still be a dependence of the scope of the invention.

What is claimed is:

1. A transmission assembly for driving at least a pair of wheels of a vehicle having a chassis which wheels are parallel and offset in relation to each other in the driving direction of the vehicle, comprising a driven shaft, axles of rotation of said wheels and a gearing arrangement housed within each wheel and provided with a pinion gear mounted on each end of said shaft to be rotated therewith and a gear secured to the wheel, said pinion gear at the one and the other end of said shaft engaging the respective one of said other gears in front of, respectively behind the axle of rotation of each wheel.

2. The transmission assembly according to claim 1, characterized in that the gear secured to the wheel is an internally toothed ring gear with which said pinion gear is internally in mesh.

3. The transmission assembly according to claim 1, characterized in that the pinion gear and the gear secured to the wheel are frictionally engaged.

4. The transmission assembly according to claim 1, characterized in that said driven shaft is journalled at each end in a hub which is pivotally connected to the chassis of the vehicle, each hub being provided with an arm which carries said axle for mounting the respective one of said wheels.

5. The transmission assembly according to claim 4, characterized in that one arm is directed forwards in the driving direction of the vehicle and the other arm is directed backwards in the driving direction.

* * * * *